(12) United States Patent
Alissa et al.

(10) Patent No.: US 12,655,341 B2
(45) Date of Patent: Jun. 16, 2026

(54) TWO COMPONENT LOW DENSITY GEL FOR THE PROTECTION OF ELECTRICAL COMPONENTS FROM CORROSION IN OIL AND GAS WELLS

(71) Applicant: Saudi Arabian Oil Company, Dhahran (SA)

(72) Inventors: Faisal Mohammed Alissa, Dammam (SA); Rajendra Arunkumar Kalgaonkar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 569 days.

(21) Appl. No.: 17/545,867

(22) Filed: Dec. 8, 2021

(65) Prior Publication Data

US 2023/0174846 A1 Jun. 8, 2023

(51) Int. Cl.
*C09K 8/54* (2006.01)

(52) U.S. Cl.
CPC ............ *C09K 8/54* (2013.01); *C09K 2208/32* (2013.01)

(58) Field of Classification Search
CPC .............................. C09K 8/54; C09K 2208/32
See application file for complete search history.

(56) References Cited

U.S. PATENT DOCUMENTS

| | | | |
|---|---|---|---|
| 2,630,410 A | 3/1953 | Clapsadle et al. |
| 3,437,149 A | 4/1969 | Cugini et al. |
| 3,500,926 A | 3/1970 | Richardson |
| 3,601,197 A | 8/1971 | Ayers et al. |

| | | | |
|---|---|---|---|
| 3,668,123 A | 6/1972 | Steinberg |
| 3,708,428 A | 1/1973 | McDonald |
| 3,713,489 A | 1/1973 | Fast et al. |
| 3,764,530 A | 10/1973 | Burland |
| 3,880,764 A | 4/1975 | Donham |
| 3,937,283 A | 2/1976 | Blauer et al. |
| 3,951,824 A | 4/1976 | Maxson et al. |
| 3,980,136 A | 9/1976 | Plummer et al. |
| 4,044,833 A | 8/1977 | Volz |
| 4,072,194 A | 2/1978 | Cole et al. |
| 4,209,409 A | 6/1980 | Forster et al. |
| 4,216,829 A | 8/1980 | Murphy |

(Continued)

FOREIGN PATENT DOCUMENTS

| | | |
|---|---|---|
| CA | 2843319 | 2/2013 |
| CN | 1425846 | 6/2003 |

(Continued)

OTHER PUBLICATIONS

Abdo et al., "Nano-Enhanced Drilling Fluids: Pioneering Approach to Overcome Uncompromising Drilling Problems," ASME, Journal of Energy Resources Technology 134:1, 014501-1, Mar. 2012, 6 pages.

(Continued)

*Primary Examiner* — Aiqun Li
(74) *Attorney, Agent, or Firm* — Dinsmore & Shohl LLP

(57) ABSTRACT

Methods for making a low-density gel or composite in a wellbore are provided. An exemplary method includes injecting a sealer component including a low-density material into the wellbore, allowing the sealer component to float to the top of an oil column, injecting an activator component including another low-density material into the wellbore, allowing the activator component to float to the top of the oil column and contact the sealer component, and contacting the sealer component and the activator component to form a gel.

15 Claims, 5 Drawing Sheets

(56) References Cited

U.S. PATENT DOCUMENTS

| | | | |
|---|---|---|---|
| 4,218,316 A | 8/1980 | Watson |
| 4,231,882 A | 11/1980 | Elphingstone et al. |
| 4,425,244 A | 1/1984 | House |
| 4,460,627 A | 7/1984 | Waver |
| 4,532,052 A | 7/1985 | Waver |
| 4,624,870 A | 11/1986 | Anthony |
| 4,680,128 A | 7/1987 | Portnoy |
| 4,711,731 A | 12/1987 | Garvey |
| 4,732,213 A | 3/1988 | Bennett et al. |
| 4,745,139 A | 5/1988 | Haasl et al. |
| 4,787,456 A | 11/1988 | Jennings, Jr. et al. |
| 4,836,284 A | 6/1989 | Tinker |
| 4,846,277 A | 7/1989 | Khalil et al. |
| 4,927,749 A | 5/1990 | Dorn |
| 5,069,283 A | 12/1991 | Mack |
| 5,125,456 A | 6/1992 | Hutchins et al. |
| 5,141,920 A | 8/1992 | Bland et al. |
| 5,178,217 A | 1/1993 | Mohammadi et al. |
| 5,238,067 A | 8/1993 | Jennings, Jr. |
| 5,320,171 A | 6/1994 | Laramay |
| 5,360,787 A | 11/1994 | Bloys |
| 5,368,833 A | 11/1994 | Johansson et al. |
| 5,424,283 A | 6/1995 | Miano |
| 5,529,123 A | 6/1996 | Carpenter et al. |
| 5,613,555 A | 3/1997 | Sorem et al. |
| 5,616,541 A | 4/1997 | Dobson, Jr. et al. |
| 5,646,092 A | 7/1997 | Carminati |
| 5,667,697 A | 9/1997 | Salmen |
| 5,836,390 A | 11/1998 | Apps et al. |
| 5,875,845 A | 3/1999 | Chatterji et al. |
| 5,912,219 A | 6/1999 | Carrie et al. |
| 5,957,203 A | 9/1999 | Hutchins et al. |
| 6,085,839 A | 7/2000 | Wyant et al. |
| 6,121,336 A | 9/2000 | Okoraofor et al. |
| 6,207,620 B1 | 3/2001 | Gonzalez et al. |
| 6,478,971 B1 | 11/2002 | Koefod et al. |
| 6,651,738 B1 | 11/2003 | Solfronk et al. |
| 6,663,778 B1 | 12/2003 | Bader |
| 6,729,409 B1 | 5/2004 | Gupta et al. |
| 6,802,375 B2 | 10/2004 | Bosma et al. |
| 7,001,872 B2 | 2/2006 | Pyecroft et al. |
| 7,013,973 B2 | 3/2006 | Danican et al. |
| 7,063,150 B2 | 6/2006 | Slabaugh et al. |
| 7,093,663 B1 | 8/2006 | Bader |
| 7,134,497 B1 | 11/2006 | Chatterji et al. |
| 7,198,722 B2 | 4/2007 | Hussain |
| 7,252,146 B2 | 8/2007 | Slabaugh et al. |
| 7,273,101 B2 | 9/2007 | Davies et al. |
| 7,278,485 B2 | 10/2007 | Kirsner et al. |
| 7,281,581 B2 | 10/2007 | Nguyen et al. |
| 7,426,961 B2 | 9/2008 | Stephenson et al. |
| 7,458,424 B2 | 12/2008 | Odeh et al. |
| 7,491,681 B2 | 2/2009 | Dobson, Jr. et al. |
| 7,507,697 B1 | 3/2009 | Shertok et al. |
| 7,533,723 B2 | 5/2009 | Hughes et al. |
| 7,559,369 B2 | 7/2009 | Roddy et al. |
| 7,581,590 B2 | 9/2009 | Lesko |
| 7,610,962 B2 | 11/2009 | Fowler |
| 7,621,334 B2 | 11/2009 | Welton et al. |
| 7,622,430 B2 | 11/2009 | Davies et al. |
| 7,645,723 B2 | 1/2010 | Kirsner et al. |
| 7,712,528 B2 | 5/2010 | Langdon |
| 7,721,803 B2 | 5/2010 | Huang et al. |
| 7,767,628 B2 | 8/2010 | Kippie et al. |
| 7,845,409 B2 | 12/2010 | Shinbach et al. |
| 7,854,277 B2 | 12/2010 | Duncum et al. |
| 7,858,563 B2 | 12/2010 | Hughes et al. |
| 7,875,575 B2 | 1/2011 | Huang et al. |
| 7,886,826 B2 | 2/2011 | Robinson et al. |
| 7,934,557 B2 | 5/2011 | Nguyen |
| 7,954,549 B2 | 6/2011 | Lende et al. |
| 8,012,358 B2 | 9/2011 | Salbaugh et al. |
| 8,053,397 B2 | 11/2011 | Huang et al. |
| 8,053,479 B2 | 11/2011 | Masuda et al. |
| 8,100,190 B2 | 1/2012 | Weaver |
| 8,132,623 B2 | 3/2012 | Allin et al. |
| 8,235,116 B1 | 8/2012 | Burts et al. |
| 8,557,916 B1 | 10/2013 | Alsharaeh et al. |
| 8,584,755 B2 | 11/2013 | Willberg et al. |
| 8,603,952 B2 | 12/2013 | Roddy et al. |
| 8,685,903 B2 | 4/2014 | Ravi et al. |
| 8,691,737 B2 | 4/2014 | Chatterji et al. |
| 8,763,699 B2 | 7/2014 | Medvedev et al. |
| 8,815,096 B2 | 8/2014 | Zuback et al. |
| 8,834,726 B2 | 9/2014 | Keister |
| 8,985,213 B2 | 3/2015 | Saini et al. |
| 9,045,965 B2 | 6/2015 | Patil et al. |
| 9,080,440 B2 | 7/2015 | Panga |
| 9,085,477 B2 | 7/2015 | Banerjee et al. |
| 9,133,386 B2 | 9/2015 | Kumar et al. |
| 9,181,789 B2 | 11/2015 | Nevison |
| 9,266,754 B2 | 2/2016 | Fazrie et al. |
| 9,321,956 B2 | 4/2016 | Nguyen et al. |
| 9,447,673 B2 | 9/2016 | Medvedev et al. |
| 9,453,156 B2 | 9/2016 | Wu |
| 9,550,933 B2 | 1/2017 | Chatterji et al. |
| 9,670,397 B2 | 6/2017 | Ghumare et al. |
| 9,725,639 B2 | 8/2017 | Vo et al. |
| 9,784,079 B2 | 10/2017 | Salla et al. |
| 9,863,231 B2 | 1/2018 | Hull |
| 10,053,613 B1 | 8/2018 | Kalgaonkar et al. |
| 10,100,245 B1 | 10/2018 | Bulekbay et al. |
| 10,113,406 B1 | 10/2018 | Gomaa et al. |
| 10,208,239 B2 | 2/2019 | Ballard |
| 10,266,748 B2 | 4/2019 | Kalgaonkar et al. |
| 10,280,122 B2 | 5/2019 | Salla et al. |
| 10,287,480 B1 | 5/2019 | Reddy |
| 10,344,200 B2 | 7/2019 | Salla et al. |
| 10,351,755 B2 | 7/2019 | Wagle et al. |
| 10,407,609 B2 | 9/2019 | Kalgaonkar et al. |
| 10,450,495 B2 | 10/2019 | Reddy |
| 10,526,524 B2 | 1/2020 | Reddy |
| 10,655,443 B2 | 5/2020 | Gomma et al. |
| 10,836,956 B2 | 11/2020 | Bulekbay et al. |
| 10,858,578 B2 | 12/2020 | Bulekbay et al. |
| 10,883,042 B2 | 1/2021 | Bulekbay |
| 10,995,263 B2 | 5/2021 | Bulekbay et al. |
| 11,053,426 B2 | 7/2021 | Kalgaonkar et al. |
| 11,203,712 B1 | 12/2021 | Kalgaonkar et al. |
| 2004/0033905 A1 | 2/2004 | Shinbach et al. |
| 2004/0040708 A1 | 3/2004 | Stephenson |
| 2004/0154799 A1 | 8/2004 | Powell |
| 2004/0157749 A1 | 8/2004 | Ely et al. |
| 2004/0173244 A1 | 9/2004 | Strothoff et al. |
| 2005/0098315 A1 | 5/2005 | Danican |
| 2005/0137094 A1 | 6/2005 | Weaver et al. |
| 2005/0194147 A1 | 9/2005 | Metcalf et al. |
| 2005/0274516 A1 | 12/2005 | Nelson et al. |
| 2005/0274517 A1 | 12/2005 | Blauch |
| 2005/0274523 A1 | 12/2005 | Brannon |
| 2005/0277554 A1 | 12/2005 | Blauch |
| 2006/0030632 A1 | 2/2006 | Krueger |
| 2006/0035808 A1 | 2/2006 | Ahmed et al. |
| 2006/0041028 A1 | 2/2006 | Crews |
| 2006/0073980 A1 | 4/2006 | Brannon et al. |
| 2007/0012437 A1 | 1/2007 | Clingman et al. |
| 2007/0042912 A1 | 2/2007 | Welton |
| 2007/0079965 A1 | 4/2007 | Nguyen |
| 2008/0035343 A1 | 2/2008 | Odeh et al. |
| 2008/0135242 A1 | 6/2008 | Lesko |
| 2008/0149329 A1 | 6/2008 | Cooper |
| 2008/0153718 A1 | 6/2008 | Heidenfelder et al. |
| 2008/0241262 A1 | 10/2008 | Lee et al. |
| 2009/0044945 A1 | 2/2009 | Willberg et al. |
| 2009/0124522 A1 | 5/2009 | Roddy |
| 2009/0143490 A1 | 6/2009 | Masuda et al. |
| 2009/0151944 A1 | 6/2009 | Fuller et al. |
| 2009/0205817 A1 | 8/2009 | Gustafson |
| 2009/0221453 A1 | 9/2009 | Mukhopadhyay et al. |
| 2009/0298720 A1 | 12/2009 | Nguyen et al. |
| 2009/0312201 A1 | 12/2009 | Huang et al. |
| 2010/0043823 A1 | 2/2010 | Lee |
| 2010/0055458 A1 | 3/2010 | Jang et al. |
| 2010/0096139 A1 | 4/2010 | Holcomb |

(56)　　　　　　　References Cited

U.S. PATENT DOCUMENTS

| | | |
|---|---|---|
| 2010/0252259 A1 | 10/2010 | Horton |
| 2010/0282468 A1 | 11/2010 | Willberg et al. |
| 2010/0323933 A1 | 12/2010 | Fuller |
| 2011/0053808 A1 | 3/2011 | Miller |
| 2011/0094746 A1 | 4/2011 | Allison et al. |
| 2011/0131873 A1 | 6/2011 | Soane |
| 2011/0251111 A1 | 10/2011 | Lin et al. |
| 2011/0257051 A1 | 10/2011 | Welton |
| 2012/0015852 A1 | 1/2012 | Quintero |
| 2012/0018143 A1 | 1/2012 | Lembcke |
| 2012/0085534 A1 | 4/2012 | Morvan |
| 2012/0097392 A1 | 4/2012 | Reyes et al. |
| 2012/0125618 A1 | 5/2012 | Willberg |
| 2012/0205313 A1 | 8/2012 | Sathrugnan et al. |
| 2012/0207795 A1 | 8/2012 | Zink et al. |
| 2012/0211227 A1 | 8/2012 | Thaemlitz et al. |
| 2012/0247764 A1 | 10/2012 | Panga |
| 2012/0305247 A1 | 12/2012 | Chen |
| 2013/0048562 A1 | 2/2013 | Keister |
| 2013/0126169 A1 | 5/2013 | Al-Nakhli et al. |
| 2013/0192839 A1 | 8/2013 | Brown et al. |
| 2013/0233623 A1 | 9/2013 | Aston |
| 2013/0260649 A1 | 10/2013 | Thomson |
| 2013/0292120 A1 | 11/2013 | Patil et al. |
| 2013/0333892 A1 | 12/2013 | McClung, IV |
| 2014/0000899 A1 | 1/2014 | Nevison |
| 2014/0060843 A1 | 3/2014 | Murphy et al. |
| 2014/0131040 A9 | 5/2014 | Panga |
| 2014/0144633 A1 | 5/2014 | Nguyen |
| 2014/0144634 A1 | 5/2014 | Nguyen |
| 2014/0144635 A1 | 5/2014 | Nguyen |
| 2014/0158354 A1 | 6/2014 | Kumar et al. |
| 2014/0158632 A1 | 6/2014 | Govind et al. |
| 2014/0290943 A1 | 10/2014 | Ladva |
| 2014/0296113 A1 | 10/2014 | Reyes |
| 2014/0352954 A1 | 12/2014 | Lakhtychkin et al. |
| 2015/0068747 A1 | 3/2015 | Hwang |
| 2015/0075797 A1 | 3/2015 | Li |
| 2015/0083420 A1 | 3/2015 | Gupta et al. |
| 2015/0083669 A1 | 3/2015 | Matherly et al. |
| 2015/0101808 A1 | 4/2015 | Saini |
| 2015/0197998 A1 | 7/2015 | Kapila et al. |
| 2015/0211346 A1 | 7/2015 | Potapenko |
| 2015/0218439 A1 | 8/2015 | Dean et al. |
| 2015/0275644 A1 | 10/2015 | Chen et al. |
| 2015/0299558 A1 | 10/2015 | Sui et al. |
| 2015/0322328 A1 | 11/2015 | Boul |
| 2015/0344765 A1 | 12/2015 | Kumar et al. |
| 2015/0369028 A1 | 12/2015 | Potapenko |
| 2016/0032169 A1 | 2/2016 | Chew |
| 2016/0090525 A1 | 3/2016 | McDonald et al. |
| 2016/0137904 A1 | 5/2016 | Drake |
| 2016/0137905 A1 | 5/2016 | Patil |
| 2016/0139588 A1 | 5/2016 | Huang |
| 2016/0153274 A1 | 6/2016 | Hull et al. |
| 2016/0154133 A1 | 6/2016 | Donderici et al. |
| 2016/0177162 A1 | 6/2016 | Nguyen |
| 2016/0177166 A1 | 6/2016 | Reddy et al. |
| 2016/0201433 A1 | 7/2016 | Kalgaonkar |
| 2016/0201443 A1 | 7/2016 | Nguyen |
| 2016/0215604 A1 | 7/2016 | Potapenko et al. |
| 2016/0230070 A1 | 8/2016 | Wagle et al. |
| 2016/0304772 A1 | 10/2016 | Al-Harbi |
| 2016/0319189 A1 | 11/2016 | Dusterhoft |
| 2016/0341019 A1 | 11/2016 | Qiu et al. |
| 2016/0347994 A1 | 12/2016 | Purdy et al. |
| 2017/0058186 A1 | 3/2017 | Oghena |
| 2017/0121593 A1 | 5/2017 | Pantsurkin |
| 2017/0138190 A1 | 5/2017 | Elkatatny et al. |
| 2017/0187177 A1 | 6/2017 | Mangum |
| 2017/0197853 A1 | 7/2017 | Chudasama et al. |
| 2018/0202278 A1 | 7/2018 | Nelson et al. |
| 2018/0244981 A1 | 8/2018 | Panga et al. |
| 2018/0265773 A1 | 9/2018 | Zhang |
| 2018/0334612 A1 | 11/2018 | Bulekbay et al. |
| 2018/0346793 A1 | 12/2018 | Al-Zoraia et al. |
| 2018/0346797 A1 | 12/2018 | Kalgoankar et al. |
| 2019/0194521 A1 | 6/2019 | Wagle et al. |
| 2019/0264095 A1 | 8/2019 | Qu et al. |
| 2019/0352555 A1 | 11/2019 | Kalgoankar et al. |
| 2019/0352556 A1 | 11/2019 | Kalgoankar et al. |
| 2021/0380867 A1 | 12/2021 | Kalgaonkar et al. |
| 2021/0380871 A1 | 12/2021 | Kalgaonkar et al. |
| 2021/0403798 A1 | 12/2021 | Kalgoankar et al. |

FOREIGN PATENT DOCUMENTS

| | | |
|---|---|---|
| CN | 101644151 | 2/2010 |
| CN | 104449631 | 3/2015 |
| CN | 104530987 | 4/2015 |
| CN | 104712288 | 6/2015 |
| CN | 104727799 | 6/2015 |
| CN | 105041288 | 11/2015 |
| CN | 105693947 | 6/2016 |
| CN | 105801783 | 7/2016 |
| CN | 105924599 | 9/2016 |
| EP | 0260888 | 3/1988 |
| EP | 0306546 | 3/1989 |
| EP | 02167604 | 12/2010 |
| EP | 17175344 | 6/2017 |
| EP | 03619279 | 3/2020 |
| EP | 03619280 | 3/2020 |
| FR | 2920435 | 8/2007 |
| GB | 2063840 | 6/1981 |
| JP | 2014196444 | 10/2014 |
| JP | 2020534460 | 11/2020 |
| RU | 2152967 | 7/2000 |
| RU | 2001132070 | 3/2004 |
| RU | 2008116114 | 10/2009 |
| RU | 2010130026 | 1/2012 |
| WO | WO 1998037014 | 8/1998 |
| WO | WO 1999036359 | 7/1999 |
| WO | WO 2003033618 | 4/2003 |
| WO | WO 2004018381 | 3/2004 |
| WO | WO 2004035473 | 4/2004 |
| WO | WO 2004035474 | 4/2004 |
| WO | WO 2004061046 | 7/2004 |
| WO | WO 2006108161 | 10/2006 |
| WO | WO 2016108161 | 10/2006 |
| WO | WO 2007017806 | 2/2007 |
| WO | WO 2008118239 | 10/2008 |
| WO | WO 2009034287 | 3/2009 |
| WO | WO 2010026553 | 3/2010 |
| WO | WO 2010070600 | 6/2010 |
| WO | WO 2012009448 | 1/2012 |
| WO | WO 2012087887 | 6/2012 |
| WO | WO 2013041633 | 3/2013 |
| WO | WO 2014085770 | 6/2014 |
| WO | WO 2014179020 | 11/2014 |
| WO | WO 2014190226 | 11/2014 |
| WO | WO 2015012818 | 1/2015 |
| WO | WO 2015041703 | 3/2015 |
| WO | WO 2015047210 | 4/2015 |
| WO | WO 2015103096 | 7/2015 |
| WO | WO 2015124214 | 8/2015 |
| WO | WO 2016032578 | 3/2016 |
| WO | WO 2017040553 | 3/2017 |
| WO | WO 2017049039 | 3/2017 |
| WO | WO 2018222648 | 12/2018 |
| WO | WO 2019051142 | 3/2019 |

OTHER PUBLICATIONS

Abdou et al., "Evaluation of Egyptian Bentonite and Nano-Bentonite as Drilling Mud," Egyptian Petroleum Research Institute (EPRI), Egyptian Journal of Petroleum 22: 53-59, 2013, 7 pages.
Agarwal et al., "Flow Behavior of Nanoparticle Stabilized Drilling Fluids and Effect of High Temperature Aging," AADE-11-NTCE-3, American Association of Drilling Engineers (AADE), presented at the AADE National Technical Conference and Exhibition, Apr. 12-14, 2011, 6 pages.
Akzonobel, "Product Data Sheet: Levasil CS30-516 P," available on or before 2020, 1 page.

(56) References Cited

OTHER PUBLICATIONS

Akzonobel, "Product Guide Bindzil and Levasil: Function and Applications," AkzoNovel, 2010, 6 pages.

Al-Muntasheri et al., "Investigation of a High Temperature Organic Water Shutoff Gel: Reaction Mechanisms," SPE 97530, Society of Petroleum Engineers International (SPE), presented at the SPE International Improved Oil Recovery Conference, Dec. 5-6, 2005, 9 pages.

Alsharaeh et al., "Evaluation of nanomechanical properties of (styrene-methyl methacrylate) copolymer composites containing graphene sheets," American Chemical Society Publications (ACS), Industrial & Engineering Chemistry Research (I&EC) 52: 17871-17881, Nov. 2013, 11 pages.

Alsharaeh et al., "Microwave Irradiation Effect on the Dispersion and Thermal Stability of RGO Nanosheets within a Polystyrene Matrix," Materials 7:7 (5212-5224), Jul. 2014, 23 pages.

Bai et al., "Case Study on Preformed Particle Gel for In-depth Fluid Diversion," SPE 113997, Society of Petroleum Engineers International (SPE), presented at the SPE/DOE Improved Oil Recovery Symposium, Apr. 19-23, 2008, 18 pages.

Baker Hughes Pressure Pumping, "Clay Master—5c Safety Data Sheet," Chem Alert, May 31, 2011, 5 pages.

Barree et al., "Realistic Assessment of Proppant Pack Conductivity for Material Selection," SPE 84306, Society of Petroleum Engineers International (SPE), presented at the SPE Annual Technical Conference and Exhibition, Oct. 5-8, 2003, 12 pages.

Beck et al., "The Effect of Rheology on Rate of Penetration," SPE/IADC 29368, Society of Petroleum Engineers International (SPE), IADC, presented at the SPE/IADC Drilling Conference, Feb. 28-Mar. 2, 1995, 9 pages.

Bern et al., "Barite Sag: Measurement, Modeling, and Management," Society of Petroleum Engineers International (SPE), SPE Drill & Completion 15:1, Mar. 2000, 6 pages.

Bern et al., "The Influence of Drilling Variables on Barite Sag," SPE 36670, Society of Petroleum Engineers International (SPE), presented at the SPE Annual Technical Conference and Exhibition, Oct. 6-9, 1996, 8 pages.

Chen et al., "Polyacrylamide and its derivatives for oil recovery," Dissertation Presented to the Faculty of the Graduate School of Missouri University of Science and Technology in Partial Fulfillment of the Requirements for the Degree of Doctor of Philosophy in Chemistry, Fall 2016, 226 pages.

Cheng et al., "Cotton aerogels and cotton-cellulose aerogels from environmental waste for oil spillaeg cleanup," Materials & Design, 2017, 130:452-458, 7 pages.

Chevalier et al., "Emulsions Stabilized with Solid Nanoparticles: Pickering Emulsions," Colloids and Surfaces A: Physicochemical and Engineering Aspects 439: 23-34, Mar. 7, 2013, 12 pages.

Chu et al., "A facile route towards the preparation of ultra-long-chain amidosulfobetaine surfactants," Synlett, 2009, 16:2655-2658, 4 pages.

Chu et al., "Glycidoxypropyltrimethocysilane Modified Colloidal Silica Coatings," MRS Proceedings, vol. 435, Jan. 1, 1996, 5 pages.

Dalrymple, "Water Control Treatment Design Technology," SPE 29194, Society of Petroleum Engineers International (SPE), proceedings of the 15th World Petroleum Congress, Oct. 12-17, 1997, 3 pages.

Dovan et al., "Delaying Geletion of Aqueous Polymers at Elevated Temperatures Using Novel Organic Crosslinkers," SPE-37246-MS, Society of Petroleum Engineers International (SPE), presented at the SPE International Symposium on Oilfield Chemistry, Feb. 18-21, 1997, 11 pages.

Drdlova et al., "Effect of Nanoparticle Modification on Static and Dynamic Behavior of Foam Based Blast Energy Absorbers," Cellular Polymers 35:3, May 2016, 16 pages.

Drdlová et al., "Effect of nanoparticle modification on static and dynamic behaviour of foam based blast energy absorbers," Cellular Polymers, 2016, 35(3), 143-158.

Dye et al., "Correlation of Ultra-Low Shear Rate Viscosity and Dynamic Barite Sag in Invert-Emulsion Drilling Fluids," SPE 56636, Society of Petroleum Engineers International (SPE), presented at the SPE Annual Technical Conference and Exhibition, Oct. 3-6, 1999, 11 pages.

Esmaeilzadeh et al., "Wettability alteration of carbonate rocks from liquid-wetting to ultra gas-wetting using TiO2, SiO2 and CNT nanofluids containing flurorchemicals, for enchanced gas recovery," Journal of Natural Gas Science and Engineering 26: 1294-1305, Sep. 2015, 12 pages.

Fan et al., "Amphiphilic Silica Nanoparticles at the Decane—Water Interface: Insights from Atomistic Simulations," American Chemical Society Publications (ACS), Langmuir 27:9 (5264-5274), May 3, 2011, 11 pages.

Gilardo et al., "Wettability alteration of sandstone cores by alumina-based nanofluids," American Chemical Society Publications (ACS), Energy and Fuels 27:7 (3659-3665), Jul. 18, 2013, 7 pages.

Gillard et al., "A New Approach to Generating Fracture Conductivity," SPE 135034, Society of Petroleum Engineers International (SPE), presented at the SPE Annual Technical Conference and Exhibition, Sep. 20-22, 2010, 14 pages.

Gomaa et al., "Acid Fracturing: The Effect of Formation Strength on Fracture Conductivity," Paper SPE 119623 presented at the SPE Hydraulic Fracturing Technology Conference, Jan. 2009, 18 pages.

Gomaa et al., "Computational Fluid Dynamics Applied to Investigate Development and Optimation of Highly Conductive Channels within the Fracture Geometry," SPE-179143-MS, Society of Petroleum Engineers International (SPE), presented at the SPE Hydraulic Fracturing Technology Conference, Feb. 9-11, 2016, 18 pages.

Gomaa et al., "Improving Fracture Conductivity by Developing and Optimizing Channels withing the Fracture Geometry: CFD Study," SPE-178982-MS, Society of Petroleum Engineers International (SPE), presented at SPE International Conference and Exhibition on Formation Damage Control, Feb. 24-26, 2016, 25 pages.

Greenwood and Gevert, "Aqueous silane modified silica sols: theory and preparation," Pigment and Resin Technology 40:5 (275-284), 2011, 10 pages.

Gurav et al., "Silica aerogel: synthesis and applications," Journal of Nanomaterials, 2010, 11 pages.

Haque et al., "Application and Suitability of Polymeric Materials as Insulators in Electrical Equipment," Energies, 2021, 14:2758, 29 pages.

Huang et al., "Systematic Approach to Develop a Colloidal Silica Based Gel System for Water Shut-Off," SPE-193942-MS, Society of Petroleum Engineers International (SPE), presented at the SPE Middle East Oil & Gas Schow and Conference, Mar. 6-9, 2017, 19 pages.

Hunt et al., "Kinetics of the gelation of colloidal silica at geothermal conditions, and implications for reservoir modification and management," Proceedings of the 38th Workshop on Geothermal Reservoir Engineers, Stanford University, Feb. 2013, 10 pages.

Iller and Dalton, "Degree of Hydration of Particles of Colloidal Silica in Aqueous Solution," Journal of Physical Chemistry 60:7, Jul. 1956, 3 pages.

Iller, "The Chemistry of Silica," John Wiley & Sons, Jun. 1979, 5 pages.

Jiantao et al., "Development of Silica Aerogel and Hollow Glass Microspheres Based Heat-Insulating Coatings," Journal Papers, Paint & Coatings Industry, 2013, Abstract only, 1 page.

Kaminsky et al., "Viscous Oil Recovery using Solid Stabilized Emulsion," SPE 135284, Society of Petroleum Engineers International (SPE), presented at the SPE Annual Technical Conference and Exhibition, Sep. 19-22, 2010, 11 pages.

Keivani et al., "Synergistic toughening in ternary silica/hollow glass spheres/epoxy nanocomposites," Polymer-Plastics Technology and Engineering, 2015, 54(6):581-593, 14 pages.

Kenny et al., "Hole-Cleaning Capabilities of an Ester-Based Drilling Fluid System," SPE Drilling & Completion, Mar. 1996, 7 pages.

Kern et al., "Propping Fractures with Aluminum Particles," SPE-1573-G, Society of Petroleum Engineers International (SPE), presented at the 35th Annual Fall Meeting of SPE, Oct. 2-5, 1960, Journal of Petroleum Technology 583-589, Jun. 1961, 7 pages.

(56) References Cited

OTHER PUBLICATIONS

Khan et al., "Graphene based metal and metal oxide nanocomposites: synthesis, properties and their applications," Royal Society of Chemistry (RSC), Journal of Materials Chemistry A 3:37, Jan. 1, 2015, 57 pages.

Kondiparty et al., "Dynamic Spreading of Nanofluids on Solids. Part 1: Experimental," American Chemical Society Publications (ACS), Langmuir 28: 14618-14623, Sep. 11, 2012, 6 pages.

Kumar et al., "Nanostructured zirconia decorated reduced graphene oxide based efficient biosensing platform for non-invasive oral cancer detection," Biosensors and Bioelectronics 78: 497-504, Apr. 1, 2016, 8 pages.

Li et al., "Fabrication and properties of machinable 3Y-Zr0"2/BN nanocomposites," Materials Science and Engineering: A 397:1-2 (35-40), Apr. 25, 2005, 6 pages.

Ligthelm, "Water Shut-off in Gas Wells: Is there Scope for a Chemical Treatment?" SPE 68978, Society of Petroleum Engineers International (SPE), presented at the SPE European Formation Damage Conference, May 21-22, 2001, 10 pages.

Liu et al., "Microwave-assisted synthesis of TiO2-reduced graphene oxide composites for the photocatalytic reduction of Cr(vi)," Royal Society of Chemistry (RSC), RSC Advances 1:7 (1245-1249), Jan. 1, 2011, 5 pages.

Liu et al., "Photolatently modulable hydrogels using unilamellar titania nanosheets as photocatalytic crosslinkers," Nature Communications 4:1 (2029), Jun. 18, 2013, 7 pages.

Liu et al., "Tough and highly stretchable graphene oxide/polyacrylamide nanocomosite hydrogels," Royal Society of Chemistry (RSC), Journal of Materials Chemistry 22:28 (14160-14167), Jan. 1, 2012, 8 pages.

Magryta, "Effect of Aerogel on the Properties of Acrylonitrile-butadiene rubber (NBR) Vulcanizates," Polimer 57:2, Feb. 1, 2012, 7 pages.

Magryta, "Wpływ aerożelu na właściwości wulkanizatów kauczuku butadienowo-akrylonitrylowego (NBR), (Effect of aerogel on the properties of acrylonitrile-butadiene rubber (NBR) vulcanizates," Polimery, 2012, 57(2):117-123, pages, with English Abstract.

Mahdavi et al., "Polyacrylamide/reduced graphene oxide-Ag nanocomposite as highly efficient antibacterial transparent film," J Iranian Chem Society 14:1 (37-46), Aug. 6, 2016, 10 pages.

Maleki et al., "An overview on silica aerogels synthesis and different mechanical reinforcing strategies," Journal of Non-Crystalline Solids, 2014, 385:55-74, 20 pages.

Matweb, Chlorinated Polyethylene Data Sheet, p. 1 (Year: 2021).

Maxey, "Rheological Analysis of Static and Dynamic Sag in Drilling Fluids," Annual Transactions of the Nordic Rheology Society 15, 2007, 8 pages.

Mayerhofer et al., "Proppants? We Don't Need No Proppants," SPE 38611, Society of Petroleum Engineers International (SPE), presented at the SPE Annual Technical Conference and Exhibition, Oct. 5-8, 1997, 8 pages.

Meyer et al., "Theoretical Foundation and Design Formulae for Channel and Pillar Type Propped Fractures—A Method to Increase Fracture Conductivity," SPE-170781-MS, Society of Petroleum Engineers International (SPE), presented at SPE Annual Technical Conference and Exhibition, Oct. 27-29, 2014, 25 pages.

Michael et al., "Enhanced Polyacrylamide Polymer Gels using Zirconium Hydroxide Nanoparticles from Water Shutoff at High Temperatures: The Thermal and Rheological Investigations," Industrial & Engineering Chemistry Research 57:48, Nov. 6, 2018, 27 pages.

Mohammadi et al., "Studying Rheological Behavior of Nanoclay as Oil Well Drilling Fluid," Res Chem Intermed 41: 2823-2831, 2015, Sep. 21, 2013, 9 pages.

Mordina et al., "Impact of graphene oxide on the magnetorheological behaviour of BaFe12019 nanoparticles filled polyacrylamide hydrogel," Polymer 97: 253-272, May 11, 2016, 15 pages.

Mowrey et al., "Achieving the Drilling Performance Benefits of a Clay-Free System in a Variety of Commonly-Used Base Fluids,"

AADE-06-DF-HO-07, American Association of Drilling Engineers (AADE), presented at the AADE Fluids Conference, Apr. 11-12, 2006, 5 pages.

Mutua et al., "Surface Modification of Hollow Glass Microspheres," Scientific Research, Materials Sciences and Applications, 3:856-860, Dec. 2012, 5 pages.

Nasr-El-Din and Taylor, "Evaluation of sodium silicate/urea gels used for water shut-off treatments," Journal of Petroleum Science and Engineering 48:3-4 (141-160), Sep. 15, 2005, 20 pages.

Nicora et al., "High-Density Invert-Emulsion System with Very Low Solids Content to Drill ERD and HPHT Wells," SPE 65000, Society of Petroleum Engineers International (SPE), presented at the 2001 SPE International Symposium on Oilfield Chemistry, Feb. 13-16, 2001, 17 pages.

Ogolo et al., "Enhanced Oil Recovery Using Nanoparticles," SPE 160847, Society of Petroleum Engineers International (SPE), presented at the SPE Saudi Arabia Section Technical Symposium and Exhibition, Apr. 8-11, 2012, 9 pages.

Palisch et al., "Determining Realistic Fracture Conductivity and Understanding Its Impact on Well Performance—Theory and Field Examples," SPE 106301, Society of Petroleum Engineers International (SPE), presented at the 2007 Hydraulic Fracturing Technology Conference, Jan. 29-31, 2007, 13 pages.

Pham et al., "Rheological evaluation of a sodium silicate gel system for water management in mature, naturally-fractured oilfields," Journal of Petroleum Science and Engineering 138: 213-233, Dec. 4, 2015, 16 pages.

Pojanavaraphan et al., "Solution cross-linked natural rubber (NR)/clay aerogel composites," Macromolecules, 2011, 44:923-931, pages.

Rotaru et al., "Performances of clay aerogel polymer composites for oil spill sorption: Experimental design and modeling," Separation and Purification Technology, 2014, 133:260-275, 16 pages.

Saasen et al., "Monitoring of Barite SAG Important in Deviated Drilling," Oil & Gas Journal, Aug. 26, 1991, 15 pages.

Saasen et al., "Prediction of Barite Sag Potential of Drilling Fluids from Rheological Measurements," SPE/IADC 29410, Society of Petroleum Engineers International (SPE), presented at the SPE/IADC Drilling Conference, Feb. 28-Mar. 2, 1995, 9 pages.

Sears, "Determination of Specific Surface Area of Colloidal Silica by Titration with Sodium Hydroxide," Analytical Chemistry 28:12, Dec. 1956, 3 pages.

Sepehrinia and Mohammadi, "Wettability alteration properties of fluorinated silica nanoparticles in liquid-loaded pores: An atomistic simulation," Applied Surface Science 371: 349-359, May 15, 2016, 11 pages.

Seright, "Washout of Cr (III)-Acetate-HPAM Gels from Fractures," SPE-80200, Society of Petroleum Engineers International (SPE), proceedings from the SPE International Symposium on Oilfield Chemistry, Feb. 5-7, 2003, 10 pages.

Shan et al., "Graphene oxide enhanced polyacrylamide-alginate aerogels catalysts," Carbohydrate Polymers 203, Jan. 1, 2019, 26 pages.

Shi et al., "Superhydrophobic silica aerogels reinforced with polyacrylonitrile fibers for adsorbing oil from water and oil mixtures," RSC advances, 2017, 7(7):4039-4045, 7 pages.

Song et al., "Plasma-induced grafting polyacrylamide on graphene oxide nanosheets for simultaneous removal of radionuclides," Royal Society of Chemistry (RSC), Physical Chemistry Chemical Physics 17: 398-406, Jan. 1, 2015, 24 pages.

Stengl et al., "h-BN-TiO 2 Nanocomposite for Photocatalytic Applications," Hindawi Publishing Corporation, Journal of Nanomaterials 2016: 4580516, Jan. 1, 2016, 12 pages.

Taha and Lee, "Nano Graphene Application Improving Drilling Fluids and performance," IPTC 18539-MS, International Petroleum Technology Conference (IPTC), presented at the International Petroleum Technology Conference, Dec. 6-9, 2015, 16 pages.

Tinsley et al., "A New Method for Providing Increased Fracture conductivity and Improving Stimulation Results," Journal of Petroleum Technology 1319-1325, Nov. 1975, 7 pages.

Tongwa et al., "Evaluation of a Nanocomposite Hydrogel for Water Shut-Off in Enhanced Oil Recovery Applications: Design, Synthesis and Characterization," Material Views, Journal of Applied Polymer Science, Jul. 17, 2012, 8 pages.

(56) References Cited

OTHER PUBLICATIONS

Van Poollen et al., "Hydraulic Fracturing—Fracture Flow Capacity vs. Well Productivity," SPE 890-G, Society of Petroleum Engineers International (SPE), TP8012, Halliburton Oil Well Cementing Co., presented at 32nd Annual Fall Meeting of Society of Petroleum Engineers Oct. 6-9, 1957, Petroleum Transactions, AIME 213, 1958, 5 pages.

Van Poollen, "Productivity vs Permeability Damage in Hydraulically Produced Fracture," Halliburton Oil Well Cementing Co., presented at meeting of Southwestern District Division of Production, Mar. 1957, 8 pages.

Veil et al., "A White Paper Describing Produced Water from Production of Crude Oil, Natural Gas and Coal Bed Methane," Technical Report prepared for the National Energy Technology Laboratory (US DOE, under Contract No. W-31-109-Eng-38), Jan. 2004, 87 pages.

Villamizar et al., "Interfacially Active SWNT/Silica Nanohybrid Used in Enhanced Oil Recovery," SPE 129901, Society of Petroleum Engineers International (SPE), presented at the 2010 SPE Improved Oil Recovery Symposium, Apr. 26-28, 2010, 11 pages.

Vincent, "Examining Our Assumptions—Have Oversimplifications Jeopardized Our Ability to Design Optimal Fracture Treatments?" SPE 119143, Society of Petroleum Engineers International (SPE), presented at the SPE Hydraulic Fracturing Technology Conference, Jan. 19-21, 2009, 51 pages.

Vincent, "Five Things You Didn't Want to Know About Hydraulic Fractures," Chapter 4, presented at the International Conference for Effective and Sustainable Hydraulic Fracturing, May 2013, 14 pages.

Wagle et al., "Using Nanoparticles to Formulate Sag-Resistant Invert Emulsion Drilling Fluids," SPE/IADC-173004-MS, IADC, Society of Petroleum Engineers International (SPE), presented at the SPE/IADC Drilling Conference and Exhibition, Mar. 17-19, 2015, 12 pages.

Wang et al., Ultralow electrical percolation in graphen aerogel/epoxy composites, Chemistry of Materials, 2016, 28:6731-6741, 11 pages.

Williams et al., "Acidizing Fundamentals," Society of Petroleum Engineers of AIME, Jan. 1979, 131 pages.

Wu et al., "Poly(2-acrylamide-2-methylpropanesulfonic acid)-modified Si0 2 Nanoparticles for Water-based Muds," Industrial & Engineering Chemistry Research (I&EC), American Chemical Society Publications (ACS), Industrial and Engineering Chemistry Research 56:1 (168-174), Dec. 20, 2016, 7 pages.

Zhang et al., "Engineering the Unique 2D Mat of Graphene to Achieve Graphene-TiO 2 Nanocomposite for Photocatalytic Selective Transformation: What Advantage does Graphene Have over Its Forebear Carbon Nanotube?" American Chemical Society Publications (ACS), ACS-NANO 5:9 (7426-7435), Sep. 27, 2011, 10 pages.

Zhang et al., "TiO 2-Graphene Nanocomposites for Gas-Phase Photocatalyptic Degradation of Volatile Aromatic Pollutant: Is TiO 2-Graphene Turley Different from Other TiO 2-Carbon Composite Materials?" American Chemical Society Publications (ACS), ACS-NANO 4:12 (7303-7314), Dec. 28, 2010, 12 pages.

Zhao et al., "Chemical Solution to ESP Packer Penetrator Corrosion Problem," presented at the International Petroleum Technology Conference, Dhahran, Saudi Arabia, Jan. 2020, 7 pages.

Zhao et al., "Development of Low Density Rigid Gels/Composites for ESP Packer Penetrator Protection," presented at the SPE Kingdom of Saudi Arabia Technical Symposium and Exhibition, Dammamm, Saudi Arabia, Society of Petroleum Engineers, Apr. 2018, 10 pages.

Zhou et al., "Preparation of a reduced graphene oxide/zirconia nanocomposite and its application as a novel lubricant oil additive," Royal Society of Chemistry (RSC), RSC Advances 5:111 (91802-91812), Jan. 1, 2015, 11 pages.

Zielinska, "Swelling of EPDM rubbers for oil-well applications as influenced by medium composition and temperature," Elastomery, TOM 20:2, Jan. 2016, 12 pages.

Zolfaghari et al., "Preparation and Characterization of Nanocomposite Hydrogels Based on polyacrylamide for Enhanced Oil Recovery Applications," Journal of Applied Polymer Science 100: 2096-2103, Feb. 17, 2006, 8 pages.

Zuo et al., "Polymer/carbon-based hybrid aerogels: preparation, properties and applications," Materials, 2015, 8(10):6806-6848, 43 pages.

200

TWO COMPONENT LOW DENSITY GEL FOR THE PROTECTION OF ELECTRICAL COMPONENTS FROM CORROSION IN OIL AND GAS WELLS

TECHNICAL FIELD

This disclosure relates to materials and methods for protecting metal components, including electric cables and connectors, from corrosive atmospheres and chemicals encountered underground (for example, in an oil well).

BACKGROUND

Electric Submersible Pumps (ESP) are commonly used artificial lift equipment in oil production wells. ESP packer penetrator systems are used to carry an electric power cable from the surface control panel to the electric motor of an ESP within the wellbore. Due to the presence of various chemicals downhole, however, the metal wires and insulation materials for the electric connectors of the power cable often are exposed to highly corrosive and hostile environments. In fact, many ESP failures can be attributed to packer penetrator failure, due to corrosion of the electric connector beneath the ESP packer.

SUMMARY

An embodiment described herein provides a method for making a low-density gel or composite in a wellbore. The method includes injecting a sealer component including a low-density material into the wellbore, allowing the sealer component to float to the top of an oil column, injecting an activator component including another low-density material into the wellbore, allowing the activator component to float to the top of the oil column and contact the sealer component, and contacting the sealer component and the activator component to form a gel.

Another embodiment described herein provides a method for protecting an electric component in a wellbore. The method includes injecting a sealer component including a density lower than oil in the wellbore, allowing the sealer component to float over the top of the oil in the wellbore to envelope the electric component, injecting an activator component including a density lower than the oil in the wellbore, allowing the activator component to float over the top of the oil in the wellbore and contact the sealer component, and forming a gel enveloping the electrical component from the sealer composition and the activator composition.

DETAILED DESCRIPTION

Figure 1:
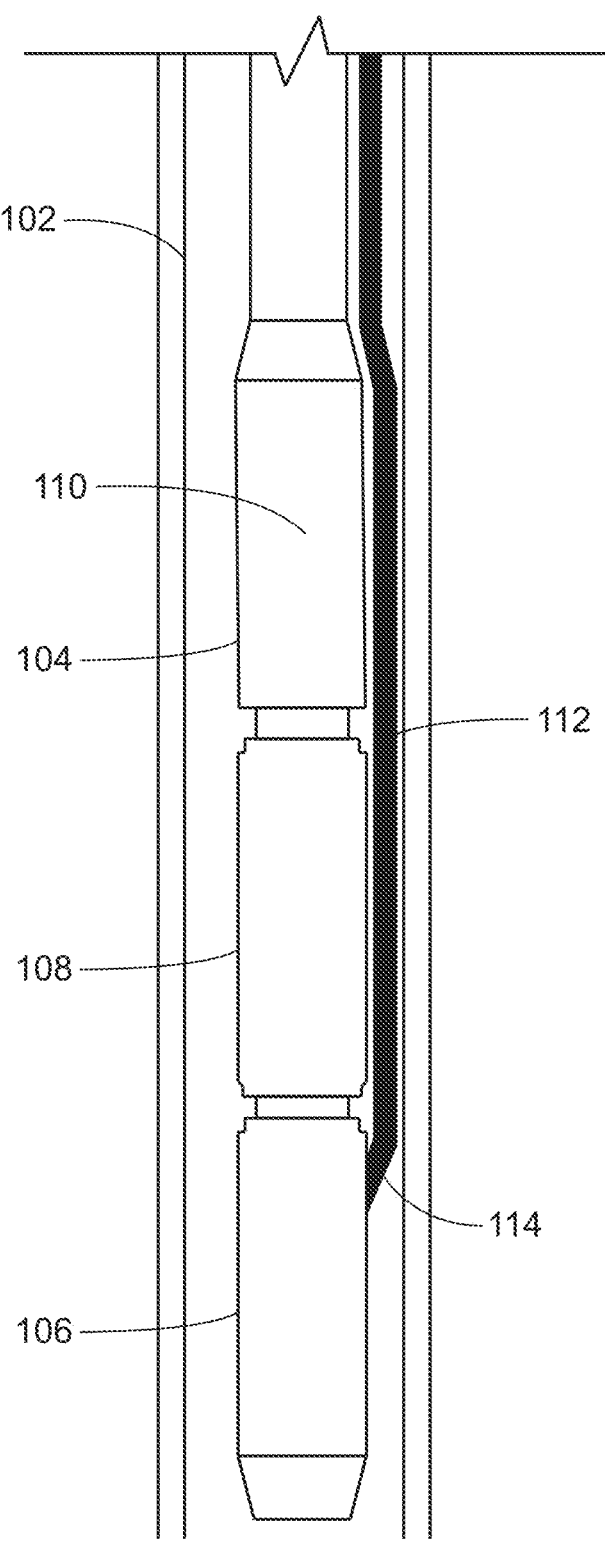
FIG. 1 is a basic depiction of an electric submersible pump.

ESP systems such as those used in oil production wells typically include a packer penetrator that carries an electric power cable from a control panel at the surface to an electric motor underground, at or near the location of the oil. Due to the presence of various chemicals downhole, however, the wires and insulation materials for the electric connectors of the power cable can be exposed to corrosive conditions and hostile environments. ESP failures often can be attributed to packer penetrator failure due to corrosion of the electric connector downhole of the ESP packer. In fact, about 30% of ESP failure results from the loss of electric contact in the ESP packer penetrator connection, leading to expensive repairs and workovers.

This disclosure provides materials and methods for isolating the electric wires and connectors of an ESP system from corrosive reservoir fluids and gases, which can significantly lengthen ESP run life. In particular, this disclosure describes the use of a two-component system, wherein one component is a sealer and the second component is an activator. Both components are a low-density fluid material and is injected separately from the other component, with the sealer injected first to float to the top of the oil column and cover the electric wires and components of the ESP system. The activator is then injected. The activator also floats to the top of the oil column and comes into contact with the sealer at which point the sealer and the activator react to form an impermeable, rigid, solid mass (for example, a gel or composite) that can insulate the ESP packer penetrator connections from well fluid and gas downhole of production packers.

Each of the components are less dense than crude oil, and therefore float uphole above, or on top of, the static oil column in the annulus between the casing and production tubing. As used herein, the term "low-density" refers to a density less than that of crude oil. Crude oil typically has a density of about 790 kg/m³ (for "light" crude oil) to about 970 kg/m³ (for "heavy" crude oil), depending on the amount of hydrocarbons in the oil. Thus, the low-density gels, composites, and components described in this document can have a density that is less than about 970 kg/m³ (for example, less than about 900 kg/m³, less than about 850 kg/m³, less than about 800 kg/m³, less than about 790 kg/m³, or less than about 750 kg/m³). The density of the gel or composite that is used can be based on the type of crude oil that is present in the well in which the gel or composite is to be placed.

Further, the density of the two components may not be the same, although both will be lower than the density of the oil in the well 102. For example, the difference in the density between the sealer component and the oil may be low, for example, 5 kg/m³, 3 kg/m³, 1 kg/m³, or less, to control the rate at which the sealer component drifts to the top of the oil column. This may lower the turbulence at the interface of the sealer component with the oil increasing the uniformity of the layer of sealer component over the oil. Similarly, the difference between the activator component and the oil may be high, for example, 3 kg/m³, 5 kg/m³, 10 kg/m³, or greater, to increase the rate at which the activator component drifts upward through the oil, and increasing the mixing of the activator component with the sealer component.

A basic depiction of an ESP is illustrated in FIG. 1, which shows a well 102 containing an ESP 104 for pumping fluids from within the well 102 to the surface. The ESP 104 includes an electric motor 106, and a seal section 108 uphole of electric motor 106. The seal section 108 seals well fluid from entry into the electric motor 106. The ESP 104 also includes a pump section that includes a pump assembly 110 located uphole of seal section 108. In addition, a power cable

112 extends alongside the ESP 104, terminating in a connector 114 that electrically couples the power cable 112 to the electric motor 106.

The materials and methods described in this specification can be used to protect electric cables and connectors, such as the power cable 112 and the connector 114 of an ESP device as shown in FIG. 1, from damage caused by the fluids and gasses within the oil well 102. In some cases, a gel or composite can be generated as a sealing mechanism for isolating an electric connection from reservoir fluids and gasses.

In some embodiments, the sealer is a crosslinked or crosslinkable polymer (for example, guar, hydroxypropyl guar (HPG), carboxymethyl guar (CMG), carboxymethyl hydroxypropyl guar (CMHPG), polyacrylamide or poly-acrylamide copolymers, hydroxyethyl cellulose, and hydroxypropyl cellulose), or a compound such as colloidal silica, which is injected into the well 102. As the sealer is mixed with components that lower its density, it floats to the top of an oil column at about the position of an ESP packer penetrator within the well 102. The activator is also mixed with components to form a low-density solution that floats to the top of the oil column to contact the sealer, causing the formation of the gel. The use of two components provides control over the location of the gel, the time to gel formation, and the like.

The activator is determined based on the crosslinkable polymer or colloidal silica material used. For example, a sealer component can be a guar-based materials, and the activator component can include borate-based or metal crosslinkers (for example, Zr-, Cr- or Ti-based crosslinkers). Sealer components that include acrylamide-based polymers can be used with activator components that include amines or metal crosslinkers (for example, Zr-, Cr-, or Ti-based crosslinkers). Sealer components that include cellulose-based polymers can be used with activator components that include metal crosslinkers (Zr-, Cr-, or Ti-based crosslinkers). In any of these examples, both the sealer component and the activator have a low density as described in this document, such that the density of the component is less than the density of the crude oil in the well (less than about 970 kg/m$^3$, less than about 900 kg/m$^3$, less than about 850 kg/m$^3$, less than about 800 kg/m$^3$, less than about 790 kg/m$^3$, or less than about 750 kg/m$^3$).

In various embodiments, the density of the sealer component and the activator component are reduced by adding one or more high-strength, lightweight fillers to the composition. The one or more fillers can give the components a density less than that of crude oil. For example, micro-spheres or "microbubbles" formed from hollow glass or polymer spheres that are filled with gas at atmospheric pressure or at reduced pressure (for example, EXPANCEL® microbubbles from AkzoNobel, or HGS19K46 Glass Bubbles from 3M®, St. Paul, MN) can be included in the components described herein, and can make the components buoyant in crude oil. Thus, in some cases, the components used in the methods described in this document can include hollow glass microspheres (HGMs) with an oil-based poly-mer fused onto their outer surface. In some cases, the sealer component can include HGMs in combination with a colloidal silica (for example, a colloidal nanosilica). For this sealer component, an activator component including HGMs in combination with a diglycidyl ether, such as 1,6-hexane-diol-diglycidyl-ether, 2,2'-[Oxybis(methylene)]bis(oxirane), or a polymeric monomer, such as poly(ethylene glycol) diglycidyl ether, may be used to cross-link the colloidal nanosilica particles. Polymeric monomers may be useful for the activator component due to an increased viscosity over low molecular weight monomers, which may stabilize the incorporation of the HGMs.

The activator component for a sealer component that includes a colloidal silica may include a pH reducing agent such as an acid, for example, hydrochloric acid (HCl), an organic acid, or sodium acetate. After the sealer component is injected, and allowed to float to the top of the oil column, the activator component including the acid is injected. The buoyancy conferred by the glass spheres can cause the activator component to rise uphole, above the oil in the column, bringing it into contact with the sealer component and triggering crosslinking.

Either the sealer component or the activator component may include any number of other low-density materials to provide buoyancy over the oil. These can include particles in the form of small spheres, beads, or chunks of material. In some cases, the low-density components can have an average diameter or width of 3 millimeters (mm) or less (for example, 2.5 mm or less, 2 mm or less, 1.5 mm or less, 1 mm or less, 2 to 3 mm, 1 to 2 mm, 500 micrometers (μm) to 1 mm, 250 to 500 μm, 100 to 250 μm, 50 to 100 μm, or 10 to 50 μm).

The density of HGS series glass bubbles typically is about 0.1 to 0.6 g/cc, and the density of the components used in the methods described in this document can be adjusted based on the percentage of added glass bubbles. The weight percentage of the glass bubbles in a component (sealer or activator) can be from about 1% to about 99% (for example, about 1 to 5%, 5 to 10%, 10 to 20%, 20 to 30%, 30 to 40%, 40 to 50%, 50 to 60%, 60 to 70%, 70 to 80%, 80 to 90%, 90 to 99%, 1 to 20%, 10 to 25%, 10 to 70%, 20 to 50%, 25 to 50%, 50 to 75%, 75 to 80%, or 80 to 95%). The percentage of glass bubbles in a component may be chosen based on the density of the other materials in the composition. The final density of the compositions provided by this document typically can be from about 0.1 to 0.8 g/cc (for example, 0.1 to 0.2 g/cc, 0.2 to 0.3 g/cc, 0.3 to 0.5 g/cc, 0.5 to 0.7 g/cc, or 0.7 to 0.8 g/cc).

In some embodiments, the sealer component includes a curable resin system (for example, an epoxy resin, a phe-nolic resin, or a furan resin) that can be used to protect ESP packer penetrator electric cables and connectors from down-hole chemicals. For example, a curable resin can be mixed with HGMs to form a sealer component. The sealer component can be delivered to a well as a liquid, pellet, or sphere with a certain size (typically less than a few millimeters, such 3 mm or less, 2.5 mm or less, 2 mm or less, 1.5 mm or less, or 1 mm or less). The activator component includes suitable curing agents mixed with HGMs, and can be delivered to well after the sealer composition in the same form as the sealer component, e.g., as a liquid, pellet, or sphere with a certain size (typically less than a few milli-meters, such 3 mm or less, 2.5 mm or less, 2 mm or less, 1.5 mm or less, or 1 mm or less). Suitable curing agents for the activator component include, but are not limited to, dieth-ylenetriamine (DTA), diethylaminopropylamine (DEAPA), N-aminoethylpiperazine (N-AEP), isophoronediamine (IPDA), diaminodiphenylsulfone (DDS), diaminodiphenyl-methane (DDM) for epoxy resins, and hexamethylenete-tramine for phenolic resins. When the lightweight activator component is pumped to the area of an ESP packer penetra-tor in a well (for example, using coiled tubing) that has the sealer component in place, it contacts the sealer component. Turbulence contributes to mixing and starts the curing or gelation process. A resin can be cured to form a block around the electric connector. In some cases, the stiffness of the resin can be tailored based on the curing agent or agents included in the activator component.

In some cases, for example, the gel includes a polymer containing urea linkages. This polymer can be formed from the combination of a sealer composition containing two or more isocyanate functional groups and an activator composition containing two or more amine functional groups.

In some cases, a polymer containing urea and urethane linkages can be formed from a compound with two or more isocyanate functional groups, a compound with two or more amine functional groups, a compound with two or more hydroxyl functional groups, or a compound with combinations of isocyanate, amine, and hydroxyl functional groups. The polymer containing urea and urethane linkages can be injecting into the well (1) a sealer component that includes a monomer of di-isocyanate with an activator component that includes monomers having diol and diamine groups; (2) forming a pre-polyurethane, forming that into a sealer component, injecting that into a well, and then polymerizing the pre-polyurethane with an activator component including a monomer of diamine; or (3) forming a polyisocyanate, polyamine, or polyol pre-polymer, using that to create a sealer component, and then polymerizing the pre-polymer with an activator component including the remaining monomers that contain the necessary functional groups. Any of the sealer or activator components containing the necessary functional groups can be a monomer or part of a pre-polymer. The pre-polymer can include more than one of the necessary functional groups. In addition, the polymer and any of the prepolymers can be natural polymers or synthetic polymers, including resins.

Examples of suitable compounds (for example, monomers or pre-polymers) that may be used as the sealer component containing two or more isocyanate functional groups include, but are not limited to, hexamethylene-diisocyanate (HDI); toluene-diisocyanate (TDI); 2,2'-, 2,4'- and 4,4'-diisocyanatodiphenylmethane (MDI); polymethyl-enepolyphenyl diisocyanate (PMDI); naphthalene-diisocyanate (NDI); 1,6-diisocyanato-2,2,4-trimethylhexane; isophorone-diisocyanate; (3-isocyanato-methyl)-3,5,5-trimethyl cyclohexyl isocyanate (IPDI); tris(4-isocyanato-phenyl)-methane; phosphoric acid tris-(4-isocyanato-phenyl ester); and thiophosphoric acid tris-(4-isocyanato-phenyl ester).

Examples of suitable compounds (for example, monomers or pre-polymers) that may be used as the activator component containing two or more amine functional groups include, but are not limited to, hydrazine; ethylenediamine; 1,2-propylenediamine; 1,3-propylenediamine; 1-amino-3-methylaminopropane; 1,4-diaminobutane; N,N'-dimeth-1-ethylenediamine; 1,6-diaminohexane; 1,12-diaminodode-cane; 2,5-diamino-2,5-dimethylhexane; trimethyl-1,6-hexane-diamine; diethylenetriamine; N,N',N"-trimethyldiethylenetriamine; triethylenetetraamine; tetraethylenepentamine; pentaethylenehexamine; and polyethyleneimine, having number average molecular weights of between 250 and 10,000; dipropylenetriamine; tripropylenetetraamine; bis-(3-aminopropyl)amine; bis-(3-aminopropyl)-methylamine; piperazine; 1,4-diaminocyclohexane; isophoronediamine; N-cyclohexyl-1,3-propanediamine; bis-(4-amino-cyclohexyl)methane; bis-(4-amino-3-methyl-cyclohexyl)-methane; bisaminomethyltricyclodecane (TCD-diamine); o-, m- and p-phenylenediamine; 1,2-diamino-3-methylbenzene; 1,3-diamino-4-methylbenzene(2,4-diaminotoluene); 1,3-bisaminomethyl-4,6-dimethylbenzene; 2,4- and 2,6-diamino-3,5-diethyltoluene; 1,4- and 1,6-diaminonaphthalene; 1,8- and 2,7-diaminonaphthalene; bis-(4-amino-phenyl)-methane; polymethylene-polyphenylamine; 2,2-bis-(4-aminophenyl)-propane; 4,4'-oxybisaniline; 1,4-butanediol bis-(3-aminopropyl ether); 2-(2-aminoethylamino)ethanol; 2,6-diamino-hexanoic acid; liquid polybutadienes or acrylonitrile/butadiene copolymers which contain amino groups and have number average molecular weights of between 500 and 10,000; and polyethers containing amino groups.

Examples of suitable compounds (for example, monomers or pre-polymers) that may be used as the activator component containing two or more hydroxyl functional groups include, but are not limited to, polyether polyols, polyester polyols, polycaprolactone polyols, polycarbonate polyols, and any combinations of the listed items.

It can be noted that the higher viscosity materials, such as prepolymers, can be used as either the sealer component or the activator component. It would be understood in these cases that the other component includes the necessary functionality for polymerization.

Figure 2:
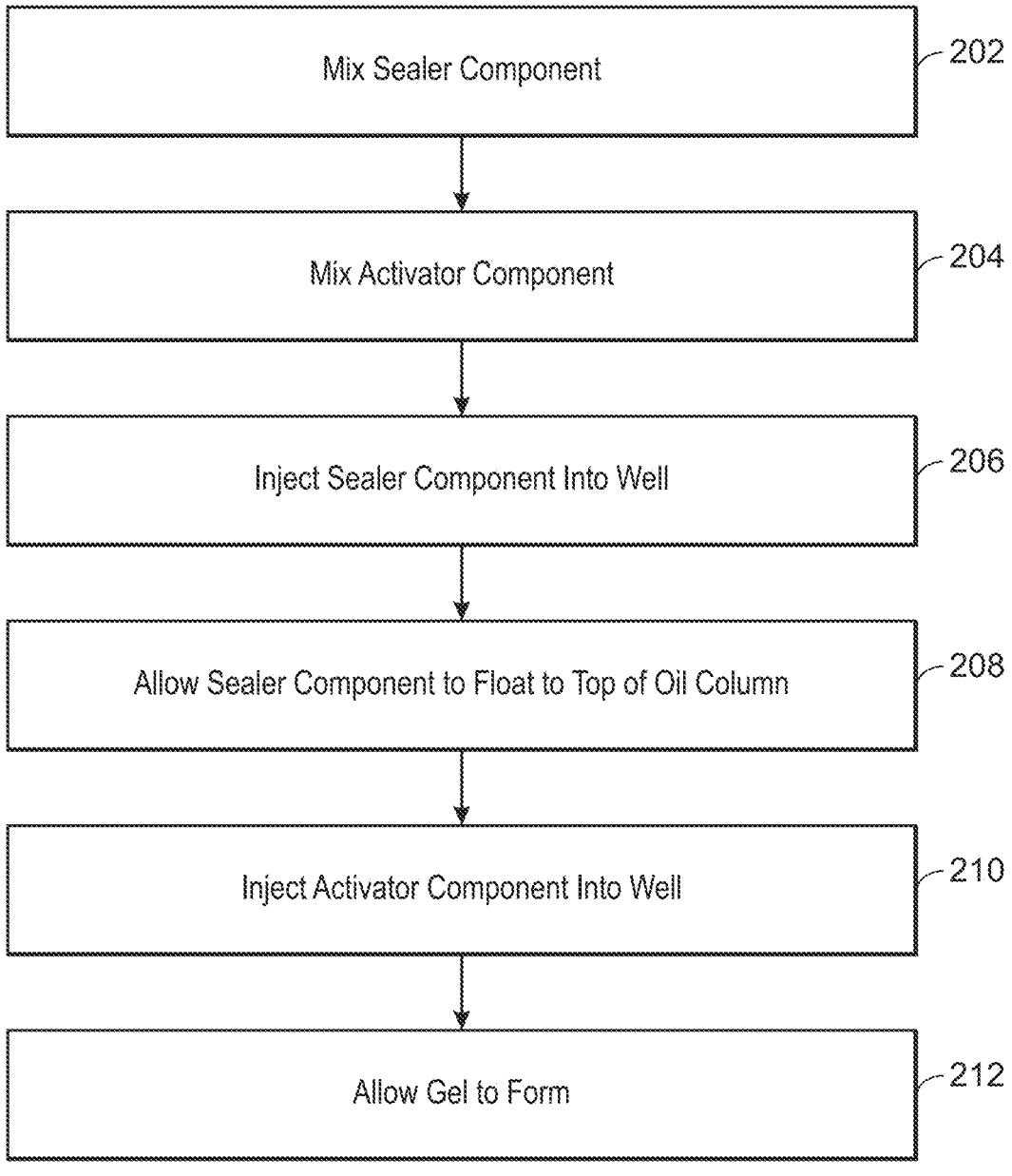
FIG. 2 is a process flow diagram of a method for producing a gel to protect electrical components, such as ESP systems, in a wellbore.

FIG. 2 is a process flow diagram of a method 200 for producing a gel to protect electrical components, such as ESP systems, in a wellbore. The method begins at block 202 with the mixing of the sealer component. As described herein, the sealer component is mixed with low-density materials to form a solution with a density of less than the oil in a column of oil, for example, in some embodiments, less than about 790 kg/m$^3$. The sealer component includes materials that can form a gel upon activation, such as colloidal silica, prepolymers, or monomers as described herein.

At block 204, the activator component is mixed. As for the sealer component, the activator component is mixed with low-density materials to form a solution with a density of less than the oil in a column of oil, for example, in some embodiments, less than about 790 kg/m$^3$.

In some embodiments, either the sealer composition includes a foaming surfactant, for example, to further lower the density. The surfactant can include sodium dodecyl sulfate, cocamidopropyl hydroxysultaine, a primary alcohol ethoxylate (PAE) surfactant, an alkylphenol ethoxylate (APE) surfactant, a secondary alcohol ethoxylate (SAE), a nonylphenol ethoxylate (NPE), an octylphenol ethoxylate (OPE), or an ethylene oxide/propylene oxide (EO/PO) copolymer, among others.

As described herein, the activator component can include materials the result in the formation of a gel upon contacting the sealer component, such as diglycidyl ethers, acids, free radical initiators, prepolymers, and the like, as determined by the selection of the sealer component.

At block 206, the sealer component is injected into the well. As described herein, this may be done through a coiled tubing line, among other techniques.

At block 208, the sealer component is allowed to flow to the top of the oil column. For example, a time delay before adding the activator component may allow the sealer component to position to the top of the world column. Depending on the amount of the sealer component added and the difference in density between the sealer component and the oil column in the well, this may take place within 1 minute, 5 minutes, 10 minutes, 20 minutes, or longer.

At block 210, the activator component is injected into the well. As for the sealer component, this may be done through a coil tubing line, among other techniques. It can be noted that as both components are inactive until combined, less expensive techniques, such as directly injecting the sealer component into the well and waiting for an appropriate time delay before injecting the activator component into the well may be sufficient.

At block 212, the gel is allowed to form. For example, a time delay before taking any further actions that disturb the materials in the well, such as initiating production, may allow the gel to set without damage. The time delay depends on the reactive system selected, and may be about 1 minute, about 5 minutes, about 30 minutes, about 1 hour, about 10 hours, or longer.

EXAMPLE

Formation of Low Density Gel

The ingredients used for the test are shown in Table 1. The test was performed by mixing the ether with the colloidal silica, hollow glass spheres, and water. The hollow glass spheres used in the tests, Expancel WE40, were about 40 microns in diameter. The supplier was Nouryon of Köln, DE. The colloidal silica used in the tests, CB-17, was obtained from AkzoNobel of Amsterdam, NE The test was performed by suspending 11 mL of CB17 (Colloidal Silica) in 22 mL of water with 10 g of EXPANCEL WE40. The ether, 1,6-hexanediol-diglycidel ether, was added, and the gelation took place in 1 minute and 40 seconds. The timeline of the experiment is in FIGS. 3-5.

Figure 3:
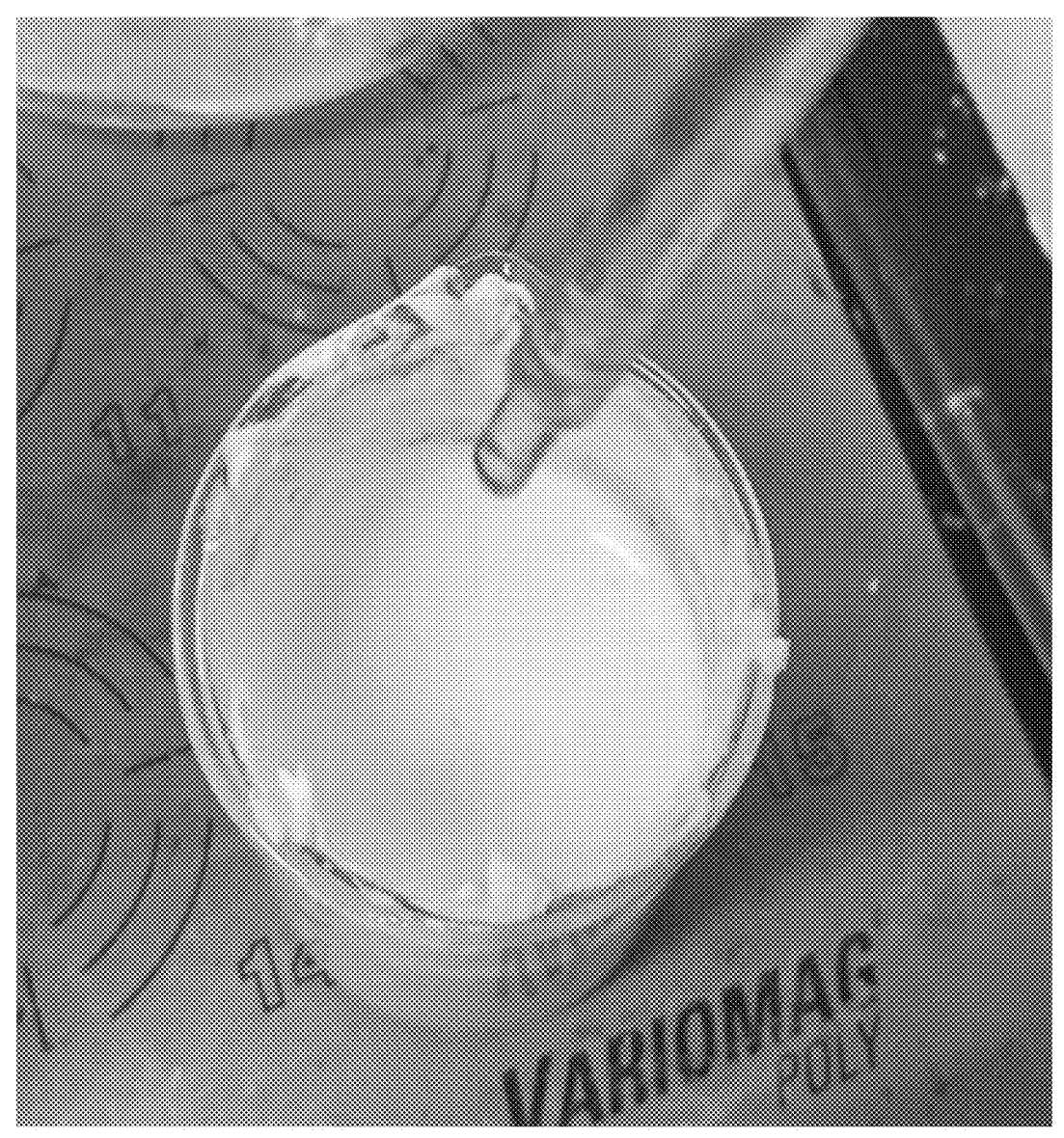
FIG. 3 is a picture before mixing the solutions, showing that both components are liquids.
Figure 4:
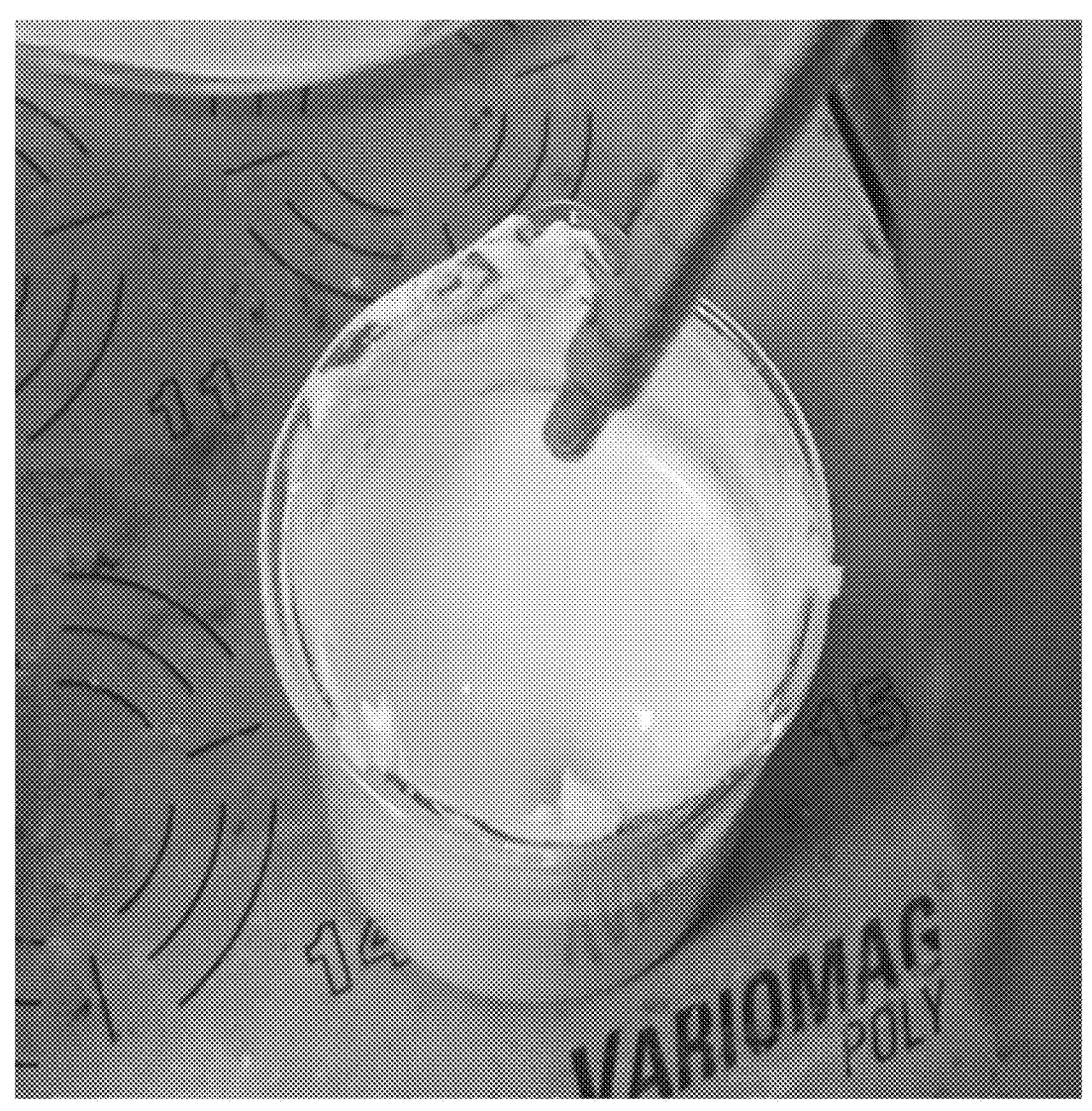
FIG. 4 is a picture of the gelation during the addition of the activator component to the sealer component.
Figure 5:
FIG. 5 is a picture of the gel formed during the test.

FIG. 3 is a picture before mixing the solutions, showing that both components are liquids. FIG. 4 is a picture of the gelation during the addition of the activator component to the sealer component. FIG. 5 is a picture of the gel formed during the test.

TABLE 1

| Materials used for test | |
| --- | --- |
| Chemical Function | Chemical Name |
| Hollow Glass Spheres | EXPANCEL WE40 |
| Ether | 1,6-Hexanediol-diglycidel ether |
| Colloidal Silica | CB-17 |

It is to be understood that while the present application has been described in conjunction with the detailed description, the foregoing description is intended to illustrate and not limit the scope of the present application, which is defined by the scope of the appended claims. Other aspects, advantages, and modifications are within the scope of the following claims.

EMBODIMENTS

An embodiment described herein provides a method for making a low-density gel in a wellbore. The method includes injecting a sealer component including a low-density material into the wellbore, allowing the sealer component to float to the top of an oil column, injecting an activator component including another low-density material into the wellbore, allowing the activator component to float to the top of the oil column and contact the sealer component, and contacting the sealer component and the activator component to form a gel.

In an aspect, the density of both the sealer component and the activator component is less than 790 kg/m³.

In an aspect, at least one of the components further includes a foaming surfactant. In an aspect, the surfactant includes one or more of sodium dodecyl sulfate, cocamidopropyl hydroxysultaine, a primary alcohol ethoxylate (PAE) surfactant, an alkylphenol ethoxylate (APE) surfactant, a secondary alcohol ethoxylate (SAE), a nonylphenol ethoxylate (NPE), an octylphenol ethoxylate (OPE), or an ethylene oxide/propylene oxide (EO/PO) copolymer.

In an aspect, the sealer component includes a crosslinkable polymer, and the activator component includes a crosslinker. In an aspect, the crosslinkable polymer includes one or more of guar, hydroxypropyl guar (HPG), carboxymethyl guar (CMG), carboxymethyl hydroxypropyl guar (CMHPG), polyacrylamide or copolymers thereof, hydroxyethyl cellulose, and hydroxypropyl cellulose.

In an aspect, the sealer component includes a curable resin, and the activator component includes a curing agent. In an aspect, the curable resin includes one or more of an epoxy resin, a phenolic resin, or a furan resin.

In an aspect, the low-density material includes rigid spheres. In an aspect, the rigid spheres include microbubbles. In an aspect, the microbubbles are glass microbubbles.

In an aspect, the sealer component includes colloidal nanosilica and the activator component includes a diglycidyl ether.

In an aspect, the sealer component includes colloidal nanosilica and the activator component includes a salt or acid with a pH of less than 7.

In an aspect, the method includes allowing the sealer component to surround an electric component at the top of the oil column. In an aspect, the method includes forming the gel to form around the electric component.

Another embodiment described herein provides a method for protecting an electric component in a wellbore. The method includes injecting a sealer component including a density lower than oil in the wellbore, allowing the sealer component to float over the top of the oil in the wellbore to envelope the electric component, injecting an activator component including a density lower than the oil in the wellbore, allowing the activator component to float over the top of the oil in the wellbore and contact the sealer component, and forming a gel enveloping the electrical component from the sealer composition and the activator composition.

In an aspect, the electric component is a power connection to an electric submersible pump (ESP). In an aspect, the power connection is an ESP packer penetrator connection.

In an aspect, the density of the sealer composition is less than 790 kg/m³.

In an aspect, the density of the activator composition is less than the density of the sealer composition. In an aspect, the density of the activator composition is less than 790 kg/m³.

In an aspect, the sealer composition, the activator composition, or both, include a low-density material. In an aspect, the low-density material includes rigid spheres. In an aspect, the rigid spheres include microbubbles. In an aspect, the microbubbles are glass microbubbles.

Other implementations are also within the scope of the following claims.

What is claimed is:

1. A method for making a low-density gel in a wellbore, comprising:

injecting a sealer component comprising a low-density material into the wellbore, wherein the sealer component has a density that is about 1 to about 5 kg/m³ less than the density of oil present in the wellbore;

after the injecting the sealer component, allowing the sealer component to float to the top of an oil column;

after the allowing the sealer component to float to the top of the oil column, injecting an activator component comprising another low-density material into the well-bore, wherein the activator component has a density that is about 3 to about 10 kg/m$^3$ less than the density of the oil;

after the injecting the activator component, allowing the activator component to float to the top of the oil column and contact the sealer component; and contacting the sealer component and the activator component to form a gel.

2. The method of claim 1, wherein a density of both the sealer component and the activator component is less than 790 kg/m$^3$.

3. The method of claim 1, wherein at least one of the sealer component or the activator component further comprises a foaming surfactant.

4. The method of claim 3, wherein the foaming surfactant comprises one or more of sodium dodecyl sulfate, cocamidopropyl hydroxysultaine, a primary alcohol ethoxylate (PAE) surfactant, an alkylphenol ethoxylate (APE) surfactant, a secondary alcohol ethoxylate (SAE), a nonylphenol ethoxylate (NPE), an octylphenol ethoxylate (OPE), or an ethylene oxide/propylene oxide (EO/PO) copolymer.

5. The method of claim 1, wherein the sealer component comprises a crosslinkable polymer, and wherein the activator component comprises a crosslinker.

6. The method of claim 5, wherein the crosslinkable polymer comprises one or more of guar, hydroxypropyl guar (HPG), carboxymethyl guar (CMG), carboxymethyl hydroxypropyl guar (CMHPG), polyacrylamide or copolymers thereof, hydroxyethyl cellulose, and hydroxypropyl cellulose.

7. The method of claim 1, wherein the sealer component comprises a curable resin, and wherein the activator component comprises a curing agent.

8. The method of claim 7, wherein the curable resin comprises one or more of an epoxy resin, a phenolic resin, or a furan resin.

9. The method of claim 1, wherein the low-density material comprises rigid spheres.

10. The method of claim 9, wherein the rigid spheres comprise microbubbles.

11. The method of claim 10, wherein the microbubbles are glass microbubbles.

12. The method of claim 1, wherein the sealer component comprises colloidal nanosilica and the activator component comprises a diglycidyl ether.

13. The method of claim 1, wherein the sealer component comprises colloidal nanosilica and the activator component comprises a salt or acid with a pH of less than 7.

14. The method of claim 1, comprising allowing the sealer component to surround an electric component at the top of the oil column.

15. The method of claim 14, comprising forming the gel to form around the electric component.

\* \* \* \* \*